May 14, 1968 R. F. MAYEUX 3,382,974
ROTARY POCKETED WHEEL CONVEYOR APPARATUS
Filed Feb. 11, 1966 3 Sheets-Sheet 1

INVENTOR:
ROBERT F. MAYEUX
BY Gravely, Lieder & Woodruff
ATTORNEYS.

United States Patent Office 3,382,974
Patented May 14, 1968

3,382,974
ROTARY POCKETED WHEEL CONVEYOR
APPARATUS
Robert F. Mayeux, Homewood, Ala., assignor to Barry-Wehmiller Company, St. Louis, Mo., a corporation of Missouri
Filed Feb. 11, 1966, Ser. No. 526,887
7 Claims. (Cl. 209—73)

ABSTRACT OF THE DISCLOSURE

Container conveyor and handling apparatus which smoothly and rapidly passes successive containers through a processing zone and onto a discharge, with means to select rejected containers for passage through the discharge zone and onto an accumulator for collecting the rejected containers separately from the flow of acceptable containers through the discharge zone, and further including discharge control gate means which is arranged to prevent jamming of containers upon blockage in the discharge area.

---

This invention relates to improvements in container conveying apparatus and is particularly concerned with rotary pocketed wheel means for handling the flow of containers passing through a device or apparatus for inspecting the containers for cleanliness.

Apparatus has already been developed for expediting the flow of containers through cleanliness inspection apparatus, the same being heretofore disclosed in U.S. Patent No. 3,160,277 assigned to the assignee of the instant application. In said patent the flow of containers from the inspection zone to the outlet was more or less under the control of the suction cup device disclosed in U.S. Patent 2,800,226 entitled "Article Sorting Apparatus," issued July 23, 1957. The present invention is an improvement over the said U.S. Patent 3,160,277 in that it avoids the use of the electromagnetic gate means which responded to a signal from the container inspection apparatus, either to close the exit when containers were inspected and approved or open the exit when a container was not approved.

It is an object of the present invention to improve upon container handling apparatus by providing a very simple freewheeling control gate for use in association with the article sorting system depicted in U.S. Patent 2,800,226.

It is another object of this invention to incorporate in a star wheel type article sorting assembly a freewheeling rotary gate device which cooperates with the article sorting means to make use of a container to temporarily block the flow through the apparatus.

Still another object of this invention is to provide an improved and unique arrangement of a rotary pocketed wheel to act as a discharge gate for container inspection apparatus, and to have the rotary pocketed wheel discriminate between conditions of downstream jam when a group of approved containers is in the exit zone, and when a rejected container happens to be in the exit zone on the occurrence of a downstream jam.

It is another object of this invention to provide a novel rotary pocketed wheel of freewheeling character which may be incorporated in a simple system which is substantially jam proof and which is self-regulating for passing containers of different sizes through an inspection zone.

These and other objects of the invention are disclosed in an arrangement of apparatus which includes means for conveying containers into and out of the apparatus, an article sorting device including star wheels and controllable suction cup means for holding the containers in the star wheel recesses during inspection and for controllable travel thereafter, and incorporating in such combination a freewheeling star wheel at the container discharge side which with the star wheel and suction cup apparatus will discriminate between acceptable containers and reject containers and prevent operating errors in the event of the occurrence of a jam on the downstream or exit side of the inspection apparatus.

The novel feature of the present invention will be set forth in certain preferred forms in the following description, reference being had to the accompanying drawings wherein.

Figure 2:
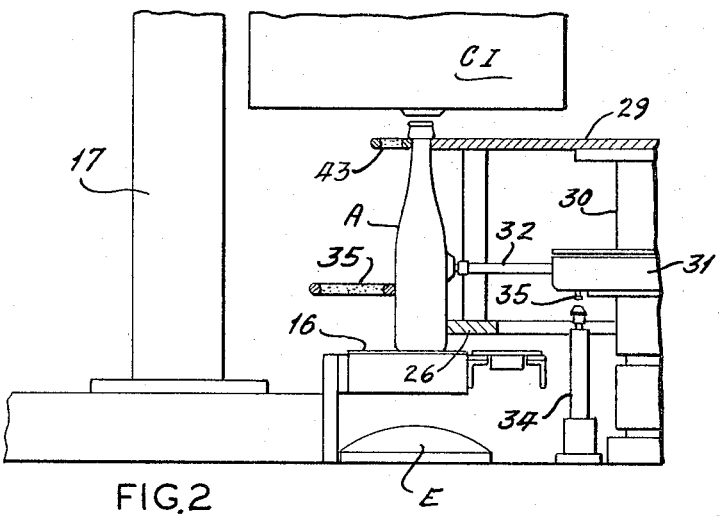
FIG. 2 is a fragmentary sectional elevational view taken at line 2—2 of FIG. 1.

Before getting into a detailed description of the parts and components of the present apparatus it should be understood that such apparatus is useful in connection with bottle inspection equipment of the type shown in U.S. Patent 3,115,970, wherein such apparatus includes a source E of illumination adjacent the bottom of containers to be inspected, which containers are usually of glass, and optical or other cleanliness inspecting means CI opposite the mouth of a container and within the line of light projection from source of illumination E. The light source E and the cleanliness inspection head CI are shown in FIG. 2 in relation to a container A which is disposed in the inspection zone of the present apparatus. While specific reference has been made to inspection means as disclosed in said Patent 3,115,970, it is understood no limitation is to be inferred, as other inspection apparatus may be utilized as will be understood by those skilled in this art.

Figure 1:
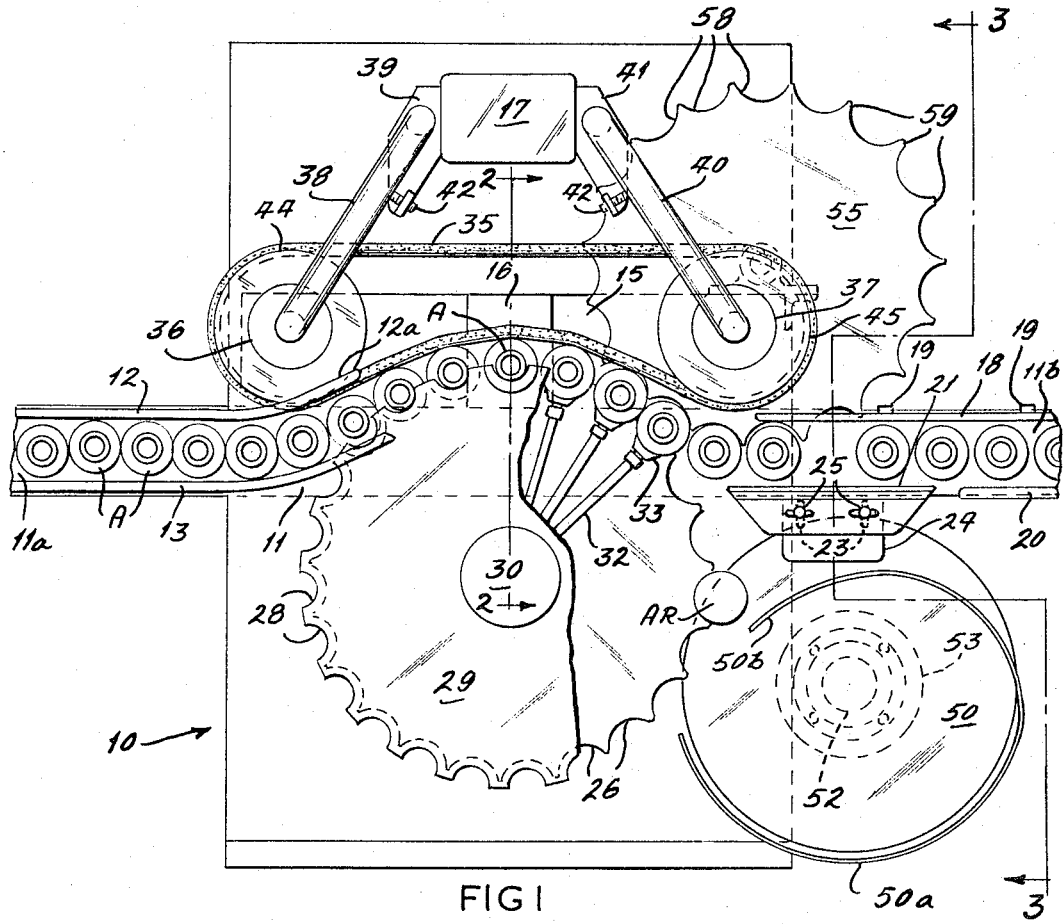
FIG. 1 is a schematic plan view of the apparatus showing the arrangement of the various components which are characteristic of the present invention.
Figure 3:
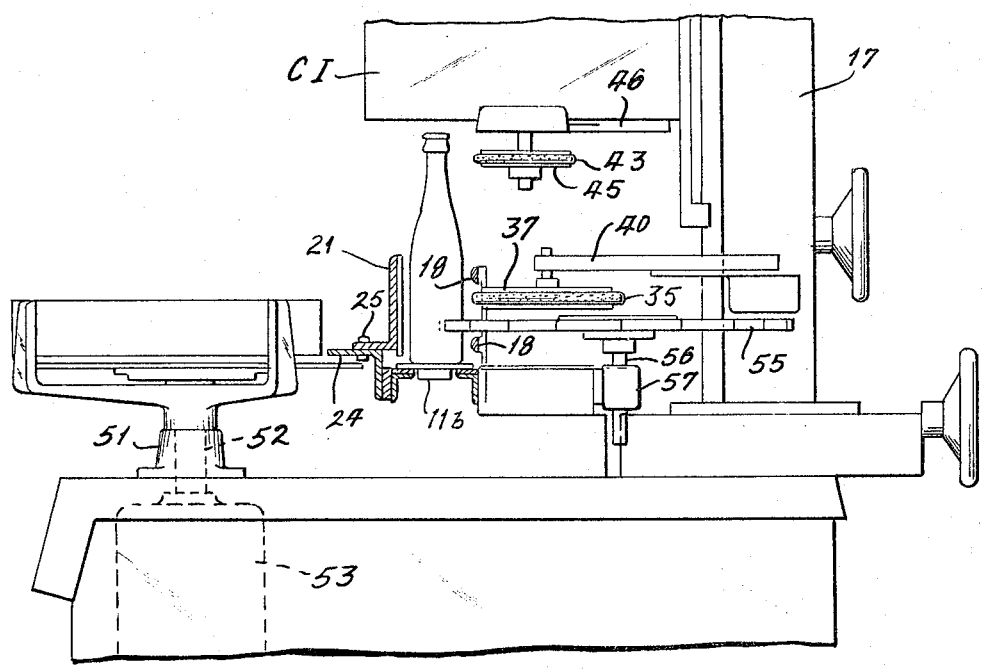
FIG. 3 is a further fragmentary stepped sectional view taken along line 3—3 in FIG. 1.

Referring now to FIG. 1, and to FIGS. 2 and 3 where convenient, it can be seen that the apparatus generally includes a supporting frame 10 having an upper surface across which is arranged a horizontal conveyor belt 11 which moves in a continuous straight path from the inlet end 11a to the outlet end 11b. The conveyor 11, of course, does not have to be a contiinuous belt, but may be divided into an inlet section which is discontinuous in the central area of the top of the frame 10 from the discharge belt section 11b. The inlet portion 11a of the conveyor is provided with suitable fixed guides 12 and 13 on its opposite margins which guides are formed with curved portions 12a and 13a for steering the row of containers. A laterally off of the conveyor 11 toward the inspection zone which is located between an inlet deadplate 14 and an outlet deadplate 15. The source of illumination E is covered by a light diffusing opalized glass panel 16, and the cleanliness inspection head is suitably supported from a vertical column 17 mounted on the frame 10 and projecting above the top surface so as to support the head CI above and in alignment with the light diffusing glass 16. After the containers have passed through the inspection zone as indicated by the glass 16 they pass over the deadplate 15, and are picked up by the exit conveyor portion 11b. The containers A in the discharge from the apparatus are guided by a fixed rail fence 18 suitably supported on vertical arms 19 and the opposite fixed rail 20. A portion of the rail 20 is made adjustable and for this purpose may consist of a suitable angular member 21 having slots 22 formed in its base angle and cooperating with transversely directed slots 23 formed in the supporting angular bracket 24. Releasable securing means 25 are mounted in the cooperating slots 22 and 23 so that the guide 21 may be adjustably moved in either or both of two directions perpendicular to and parallel with the conveyor portion 11b.

In view of the prior disclosures in said patents 2,800,226 and 3,160,277 it will not be necessary in this specification to do more than point out that in the several views of the drawings herein the containers A being brought to the apparatus on conveyor portion 11a are caused by the crowding effect of the conveyor themselves and the movement of the conveyor 11 to find seats in the peripheral pockets 26 on a bottom star wheel 27 and aligned peripheral pockets 28 on an upper star wheel 29. The star wheels 27 and 29 are operably mounted on a shaft 30 rotatably mounted in suitable bearings (not shown) in the frame 10. The lower star wheel 27 is adapted to have its pockets or recesses 26 engaged by the body portion of containers A and is therefore formed on a somewhat smaller diameter than the upper star wheel 29 which has its pockets 28 engaged by the neck portions of the containers A. Inspection of FIGS. 1 and 2 will clearly disclose this characteristic.

As is shown in FIG. 2 the star wheels 27 and 29 are vertically spaced and there is a hub 31 carried by the shaft to house suitable vacuum control means which is not necessary to show. The vacuum is related to the individual containers A through suction arms 32 and cup elements 33 on the outer ends of each arm 32. The arms 32 and suction cup 33 are equal in number to the number of pockets 26 in the star wheel 27. Suitable operating means 34 is provided under the hub 31 by the projecting elements 35. Thus, containers are individually engaged by the respective suction cups 33 at the point where each container A leaves the conveyor 11 and is temporarily supported by having its bottom resting on the deadplate 14. The suction cup 33 will continue to grip a container during the angular travel from the point of pick-up to the point where the container is beginning to move off of the deadplate 15 and on to the conveyor 11 after it has passed beyond the zone of inspection depicted by the illumination diffusing plate 16. In view of FIG. 1, the containers A will be successively gripped by suction cups 33 at approximately two container positions in advance of the inspection station and for at least a minimum of two positions downstream of the inspection station. The exception will be when a suitable rejection pulse is created from the cleanliness inspection head CI which will trigger the suction cup of the dirty container A to maintain suction grip with the container until it has traveled around to the reject station represented by container AR (meaning a reject container). It is not necessary to provide details of the trigger mechanism responsive to a signal or pulse generated in the cleanliness inspection head CI as such details may be obtained in said patents heretofore identified.

The conveyor means 11, as can be seen in FIG. 1, is called upon to support the successive containers A for a certain angular degree of movement around a portion of the arc of the star wheels 27 and 29. This is necessary in order to expose the bottom of each container A as it reaches the inspection station. In order to support the containers A the apparatus is provided with a lower resilient belt 35 which is trained over pulleys 36 and 37. Pulley 36 is operatively supported on a swing arm 38 pivoted on a suitable bracket 39 adjacent the vertical column 17. Similarly pulley 37 is supported on a swing arm 40 pivotally mounted on a bracket 41 adjacent vertical column 17 and arms 38 and 39 are adjustably angularly separated by stop means 42. The belt means 35 is preferably made of a suitable spring coil which has the characteristic of drawing the pulleys 36 and 37 toward each other and against the stop 42. Increased tension in the belt 35 can be obtained by increasing the angular spread between arms 38 and 40. As shown in FIG. 2, there is an upper resilient belt 43 which is trained over pulleys 44 and 45 which are, in turn, respectively supported on arms 46 and 47. Arms 46 and 47 are pivotally carried on a suitable part of the inspection head CI as may be seen in FIG. 3. The belt 43 is again preferably formed of a coil spring so that it has a certain amount of initial tension when trained over the pulleys 44 and 45. The pulleys 44 and 45 are angularly adjustable so that the belt 43 will cooperate with pockets 28 in the star wheels 29 to fix the position of the neck portion of the containers at least during the passage through the inspection station. The rejected containers AR as shown in FIG. 1, are carried around the periphery of the star wheels 27 and 29 until they may be safely deposited on the surface of a reject accumulator device 50 which is, in this case, a rotary horizontal table mounted in a bearing 51 which supports a vertical shaft 52. Suitable motor means 53 is utilized to rotate the accumulator 50 so that there will be no obstruction or impairment of the free delivery and release of rejected containers AR.

A unique feature of the present invention is the provision of a freewheeling rotary gate device 55 which is shown in plan view in FIG. 1 and in elevational view in FIG. 3. The gate device 55 has a vertical shaft 56 bearinged in mount 57 so that the gate device will rotate in a plane just below the pulley 37, and so the pockets 58 formed in the periphery of the gate device 55 will extend past the guide rails 18 and extend over the discharge conveyor portion 11b at a point opposite the adjustable guide 21. It must be appreciated that the containers A are brought to the apparatus on conveyor portion 11a and are by that conveyor portion carried into the star wheels 27 and 29 where they are held temporarily by the coil spring belts 35 and 43 until they are again returned to the discharge conveyor portion 11b or to the reject accumulator device 50. If there is any substantial interruption in the feeding of containers A, the star wheels 27 and 29 may not be caused to rotate and this will in turn stop the freewheeling action of the rotary gate device 55.

Figure 4:
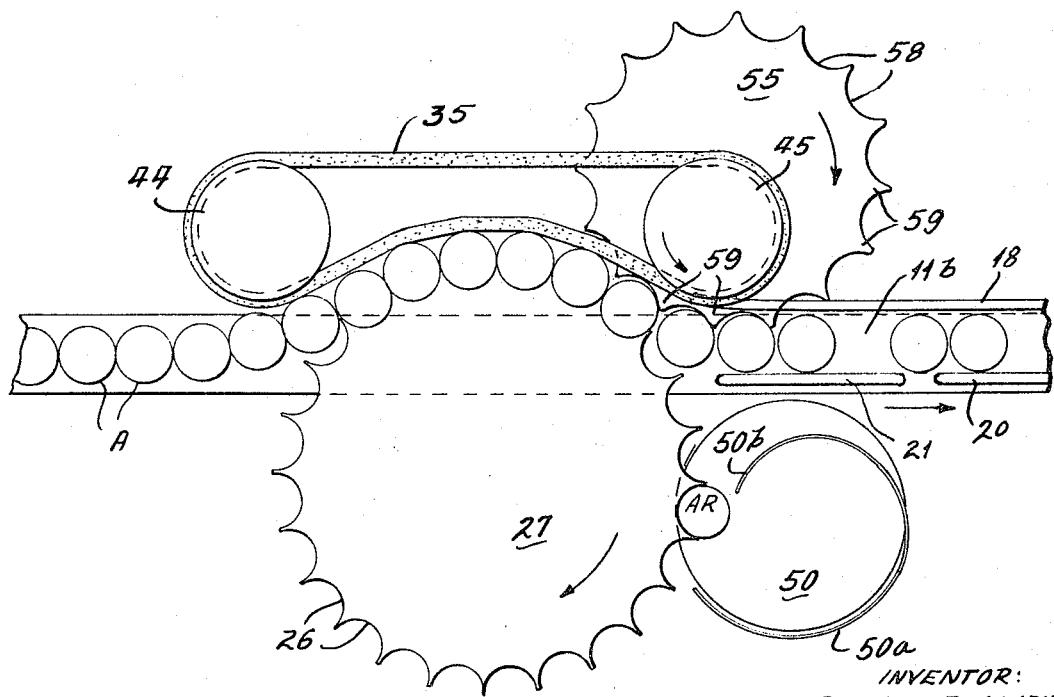
FIG. 4 is a schematic plan view of the apparatus, similar to the view of FIG. 1, but illustrating the normal operation of the apparatus when a container is rejected.
Figure 5:
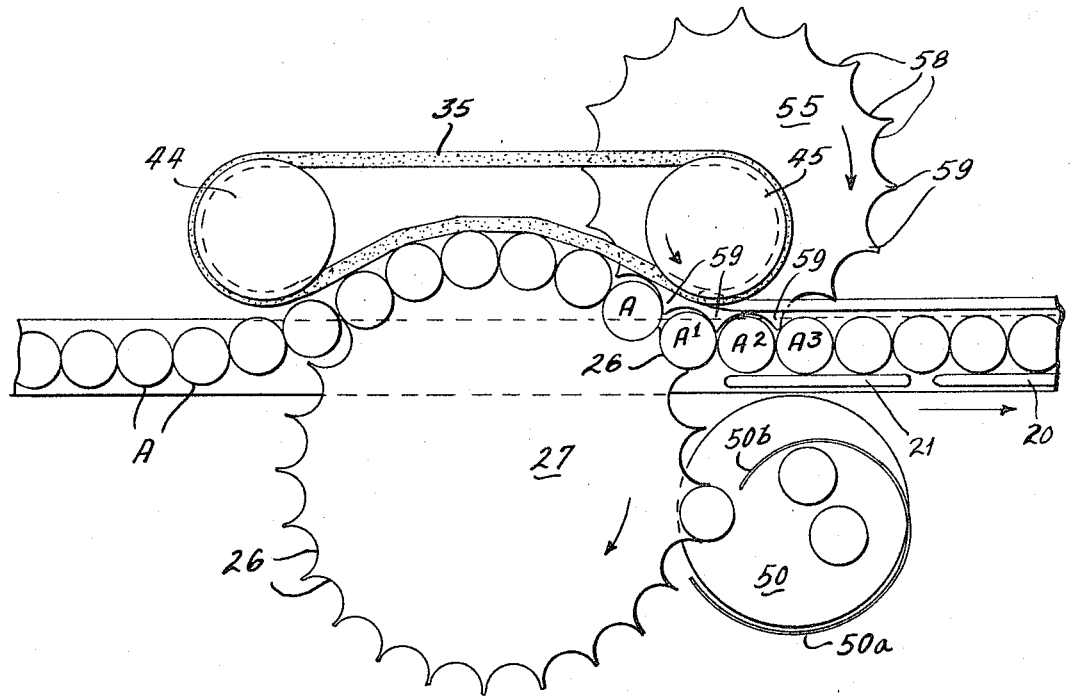
FIG. 5 is a view similar to FIG. 4 showing the occurrence of a downstream jam and the behavior of the freewheeling rotary gate device.
Figure 6:
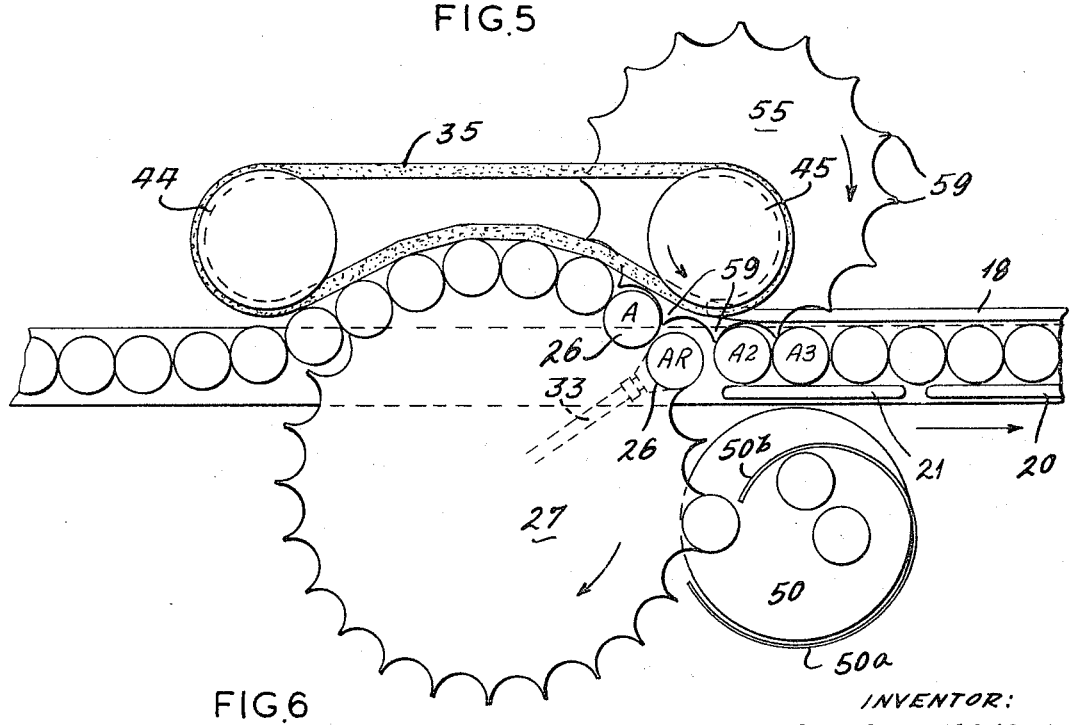
FIG. 6 is another plan view similar to FIG. 5 but showing a downstream jam condition at the moment when a rejected container happens to be in the gate zone adjacent the freewheeling rotary gate device.

FIGS. 4, 5 and 6 illustrate schematically certain operative conditions which will now be described. In FIG. 4 it is assumed that there is a constant supply of containers A so that the pockets of the star wheels are continuously filled and the resilient belt means are effective to suspend the containers while they pass through the inspection station. If there are no rejected containers, each container as it reaches a position where its pocket begins to relate to a pocket 58 on the rotary gate device will act to align the pocket of the rotary gate device with a pocket on the star wheel. This places a cusp 59 on the rotary gate device between two containers. The cusp 59 will remain between ewo containers until the leading container is safely back on the conveyor discharge portion 11b. The linear travel of the conveyor portion 11b will then force the container to pass between the adjustable guide 21 and the rails 18 on its downwstream exit. In the conditions shown in FIG. 4 a rejected container AR has been carried to the accumulator 50 thereby creating a gap in the alignment of the containers which have been accepted and are moving downwstream on conveyor portion 11b. The accumulator device is seen to have a suitable enclosing fence 50a in which a terminal portion 50b is spiraled inwardly so as to form a fender to prevent previously accumulated containers moving on the rotary accumulator from remaining on the periphery where they could interfere with other rejected containers arriving at the accumulator.

In FIG. 5 there is schematically shown in plan view the present apparatus in a condition where there is a downstream jam which will prevent the discharging containers A from moving downstream. Thus, the containers will crowd up along the conveyor portion 11b in spite of the forward movement of the conveyor 11. At this time the rotary gate device 55 will have its cusps 59 separating certain of the containers in the critical discharge area as will now be explained. As the containers crowd up on the downstream side container $A_3$ and container $A_2$ will be pushed against guide 21 by container $A_1$, thus fixing the device 55 in position wanting to push container $A_2$ but prevented by container $A_3$. Container $A_2$ blocks container $A_1$, which, in turn, blocks container A and the star wheels 27 and 29 are blocked from turning. In the condition shown in FIG. 5, containers A and $A_2$ are spaced sufficiently to free container $A_1$ between the rotary gate device 55 and the star wheels 27 and 29. The movement of conveyor 11 holds container $A_1$ in abutment with container $A_2$, but container A will not be able to advance because of the blockage of containers on the discharge side. This action will consequently prevent the rotary gate device 55 from moving any further. As a consequence, the jammed row of containers downstream of container $A_3$ will not be pushed any further and the apparatus will remain stopped. This therefore leaves container $A_1$ in a loose condition so that there is no danger of crushing any of the containers when the jam is relieved and the apparatus is again permitted to handle a forward flow of containers. The conditions illustrated schematically in FIG. 5 are those which obtain on a downstream jam when there are only acceptable containers adjacent the rotary gate device 55.

Turning now to FIG. 6 there is illustrated a condition of operation of the present device where on a jam-up on the downstream side of conveyor 11 there happens to be a reject container AR in the gate zone. It can be appreciated from what has been described in relation to FIG. 5 that in FIG. 6 the jam up will react on container $A_3$ to cause its adjacent container $A_2$ to stop the rotary movement of gate device 55. By blocking such rotation it will immediately prevent a cusp 59 driving container A into the pocket 26 thereby making the container A act as a stop for the star wheel 27. Under this condition, instead of having an acceptable container $A_1$ as in FIG. 5, the schematic view shows a rejected container AR in a condition of being held by a suction cup 33 in a star wheel pocket 26 so that the conveyor 11 has no effect. The rejected container AR will be maintained in its star wheel pocket 26 by the suction effect of the cup 33 so that when the downstream jam is relieved and the apparatus is restored to normal operation reject container AR will not move into the downstream flow but will be carried around to the accumulator 50 where it will then be released. Continued feeding of containers through the apparatus will eventually close up the gap left by the removal of the rejected container AR, such gap being previously noted in connection with FIG. 4.

There has accordingly been described and shown herein a novel, simple and efficient means for insuring the smooth trouble free operation of inspection apparatus which is provided with means to reject certain containers and accept all others. Also included is an unique rotary gate device of a freewheeling type which positively prevents breaking of fragile containers and miscycling of the inspection equipment. While a preferred embodiment has been shown and described it can be appreciated by those skilled in the art that changes, variations and modifications may be made. However, it is intended to include all variations, modifications or changes and any equivalent thereof within the spirit of the disclosure and scope of the appended claims.

What is claimed is:

1. Container conveying and handling apparatus comprising: substantially flat top means for conveying containers in series alignment through the apparatus along a predetermined path having an inlet and an outlet in spaced relation, first rotary means movable in response to containers supported and moved by said conveying means and having container receiving recesses in the periphery thereof, said first means positioned with a portion of its periphery positioned adjacent said conveying means to receive containers in said peripheral recesses, said conveyor regulating container movement between said inlet and outlet; and gate means adjacent the container outlet including second rotary means having container receiving recesses in the periphery thereof, said second rotary means being spaced from said first rotary means and at one side of said conveying means outlet, containers in said recesses of said first rotary means being moved by said conveying means into meshing engagement in recesses of said second rotary means, and guide means adjacent said conveying means outlet in position relative to said second rotary means to receive containers moved by said conveying means from said first to said second rotary means and guide the containers to said conveying means outlet, said second rotary means and said guide means being adapted to regulate the movement of containers leaving the recesses of said first rotary means and retain the containers in substantial series alignment to said conveying means outlet in normal operation of said apparatus and upon blockage of said outlet.

2. The appartus set forth in claim 1 wherein said first and second rotary means are freewheeling and rotate upon operation of said conveying means forcing the containers into the peripheral recesses, and said conveying means is adapted to slide under the containers upon blockage of said outlet.

3. The apparatus set forth in claim 1 wherein said first rotary means has its peripheral portion extending laterally of said conveying means to define a path of container movement temporarily to one side of said predetermined path, and means is provided for holding the containers in engagement with the peripheral recesses of said first rotary means during the movement of the containers in said temporary path to one side of said predetermined path.

4. The apparatus set forth in claim 3 wherein there is included inspection means in said temporary path to inspect the containers for a characteristic condition, means adjacent said first rotary means to exert a grip on containers moved in said temporary path, and a container collecting device adjacent said conveying means outlet and at the opposite side from said second rotary means, said container grip means being adapted to deposit containers on said device which fail to have the characteristic condition.

5. Container conveying apparatus comprising: a horizontally directed conveyor having inlet and outlet portions, first freewheeling rotary means between said inlet and outlet portions and having a periphery extending across said conveyor from one side to beyond the opposite side, flexible auxiliary conveyor means cooperating with said first rotary means to engage containers and arrange the containers in series alignment abutting said periphery and retain the containers in abutment during movement beyond the conveyor at the opposite side thereof and return to the conveyor, second freewheeling rotary means positioned at said conveyor opposite side and adjacent said first rotary means and said conveyor outlet portion, said second rotary means having a periphery engaging the containers retained by said auxiliary conveyor means and acting to maintain the series alignment thereof, guide means adjacent said one side of said conveyor adjacent said outlet portion and cooperating with said second rotary means to steer the containers into said outlet portion, and cusps formed on the peripheries of said first and second rotary means to extend between the separate the containers, said cusps and said guide means controlling the containers against jamming at said first and second rotary means upon blockage in said conveyor outlet portion and continued operation of said conveyor to bring containers to said inlet portion.

6. The apparatus set forth in claim 5 and including a container collecting device adjacent said conveyor outlet portion and said first rotary means, said guide means being spaced from said first rotary means a distance to pass containers to said device, and container holding means adjacent said first rotary means to hold containers in abutment with the periphery of said first rotary means for movement off said conveyor outlet portion and onto said device.

7. In container conveying and handling apparatus the combination of: container conveying means having a substantially flat top surface on which the containers are supported; container handling means disposed adjacent said conveyor means and including a rotary member having peripheral recesses to locate containers in series order and direct the same between a receiving zone and a discharge zone where said conveyor means propels the containers out of said rotary member recesses; container discharge control gate means located in the discharge zone and including an auxiliary rotary member having peripheral recesses that align with containers in the recesses of said first named rotary member, the respective adjacent recesses in said rotary member and auxiliary rotary member being spaced apart to provide in the discharge zone successive spaces confining successive containers reaching the discharge zone upon said conveying means, and a guide member spaced from both of said rotary members and forming with said auxiliary rotary member a space through which the containers are moved by said conveying means on leaving the recesses in said auxiliary rotary member; and other means selectively operable and movable with said first rotary member to selectively retain containers in its recesses to propel the containers past said guide member and away from said conveyor means.

References Cited

UNITED STATES PATENTS 2,985,008   5/1961   Renard _____ 209—74 X

ALLEN N. KNOWLES, *Primary Examiner.*